R. F. SCHULTZ.
BALL BEARING AND RETAINER THEREFOR.
APPLICATION FILED AUG. 4, 1911.
1,048,216.
Patented Dec. 24, 1912.
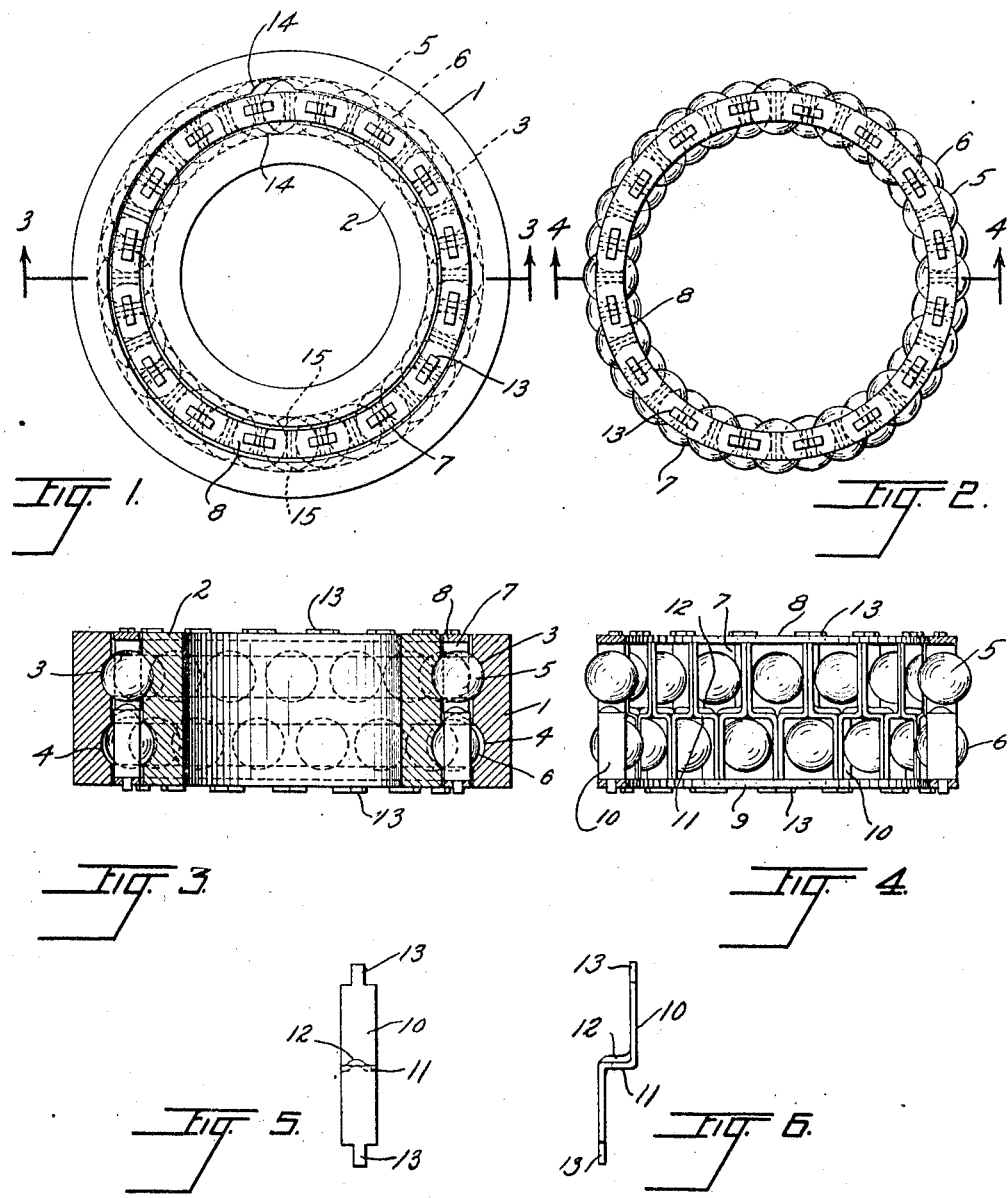

UNITED STATES PATENT OFFICE.

RICHARD F. SCHULTZ, OF CHICAGO, ILLINOIS.

BALL-BEARING AND RETAINER THEREFOR.

1,048,216. Specification of Letters Patent. Patented Dec. 24, 1912.

Application filed August 4, 1911. Serial No. 642,240.

*To all whom it may concern:*

Be it known that I, RICHARD F. SCHULTZ, a citizen of the United States, and residing at Chicago, in the county of Cook and State of Illinois, have invented a new and useful Improvement in Ball-Bearings and Retainers Therefor, of which the following is a complete specification.

The main objects of this invention are to provide an improved construction of ball bearings having a double raceway; to provide a retainer for ball bearings adapted for use with a double raceway; to provide a retainer for ball bearings adapted to hold the balls of a double raceway bearing in such position that those of one raceway will be arranged staggering with those of the other; and to provide a cheap, simple and durable construction adapted to maintain the balls in such position with respect to each other that one of the same will always be in position to take the direct downward weight or thrust on the bearing.

A specific embodiment of the invention is illustrated in the accompanying drawings, in which:

Figure 1 is a side elevation of a bearing embodied in this invention. Fig. 2 is a side elevation of the retainer with the balls therein. Fig. 3 is a section taken on line 3—3 of Fig. 1. Fig. 4 is a section taken on line 4—4 of Fig. 2. Fig. 5 is a front elevation of one of the retainer plates. Fig. 6 is a side elevation of said plate.

In the construction shown, the bearing rings 1 and 2 are each provided with two grooves 3 and 4 which register with like grooves in the other and together provide two laterally disposed raceways for the bearing balls 5 and 6.

For the purpose of holding the balls of each raceway from contact with each other and for holding the balls of one raceway in staggering relation with those of the other raceway so as to more evenly distribute the load on the balls, a retainer 7 is provided. Said retainer comprises two apertured retainer rings 8 and 9, adapted to lie between the bearing rings 1 and 2, at the edges thereof, and which are connected together by a plurality of retainer plates 10. Each of said plates is approximately Z shaped, having a central offset portion 11 extending circumferentially of the bearing between the two raceways, and having its ends approximately parallel. The offset portion 11 is upset as at 12 to give it greater strength, and the ends of the plates are provided with reduced portions or lugs 13 adapted to extend through the apertures in the retainer rings 8 and 9 and be turned over to secure the plates to the rings. Said plates are so arranged that one end of each lies flat against one end of the next adjacent plate on one side thereof, and its other end lies flat against the adjacent end of the adjacent plate on the opposite side thereof. With this arrangement two corresponding ends of two adjacent plates are spaced apart to receive a ball of one raceway, and the other two ends lie close together and space two adjacent balls of the other raceway, and the spaces for balls in one raceway are arranged staggering with those for balls in the other raceway, as shown more clearly in Fig. 4.

The bearing rings are provided with notches 14 in one side which open to the raceway 3, and with notches 15 in the other side which open to the raceway 4, for the admission of the balls.

The operation of the construction shown is as follows: When assembling the device the balls of one raceway are placed in position and the retainer plates are placed therebetween, then the balls of the other raceway are inserted between the opposite ends of the plates, and the retainer rings are secured to the ends of the plates. The retainer thus formed then holds the balls of one raceway staggering with respect to those of the other raceway so that when the interval or space between two adjacent balls of one raceway is in direct vertical alinement with the downward pressure on the bearing, a ball in the other raceway will also be in direct alinement with the downward pressure, and thereby give a maximum efficiency to the bearing.

While but one specific embodiment of the invention has been herein shown and described it will be understood that many details of the construction shown may be varied or omitted without departing from the scope of the claim.

I claim:

A retainer for ball bearings, comprising a plurality of retainer plates having central offset portions, the offset portions of any two adjacent plates being directed oppositely from each other, said plates each being rigidly secured at one end to the next adjacent plate at one side thereof, and at the other end to the next adjacent plate at the other side thereof, and retainer rings at the ends of said plates adapted to hold them in fixed relation.

In witness whereof I have hereunto subscribed my name in the presence of two witnesses.

RICHARD F. SCHULTZ.

Witnesses:
 RICHARD A. SCHULTZ,
 JOSEPH SCHLENKER.